Sept. 30, 1952　　　　C. C. MILLER, JR　　　2,612,062
MAIN DRIVE UNIT FOR TANDEM ROTOR HELICOPTERS
Filed July 7, 1949　　　　　　　　　　　　　　4 Sheets—Sheet 1

Charles C. Miller, Jr.
INVENTOR.

BY
Leech & Radue
ATTORNEYS

Sept. 30, 1952     C. C. MILLER, JR     2,612,062

MAIN DRIVE UNIT FOR TANDEM ROTOR HELICOPTERS

Filed July 7, 1949     4 Sheets-Sheet 2

Sept. 30, 1952        C. C. MILLER, JR        2,612,062
MAIN DRIVE UNIT FOR TANDEM ROTOR HELICOPTERS
Filed July 7, 1949        4 Sheets-Sheet 4
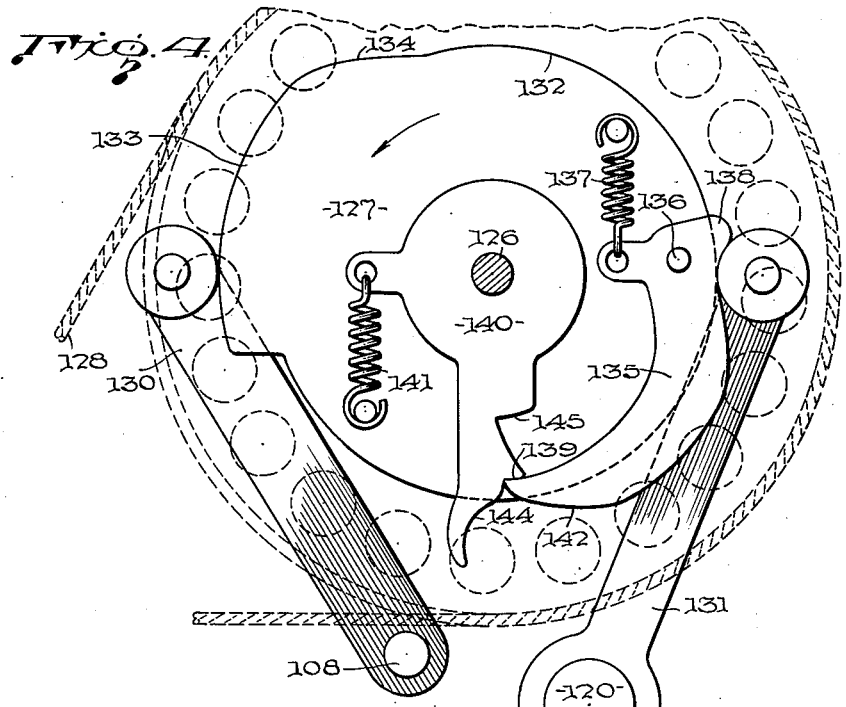

Patented Sept. 30, 1952

2,612,062

UNITED STATES PATENT OFFICE 2,612,062

MAIN DRIVE UNIT FOR TANDEM ROTOR HELICOPTERS

Charles C. Miller, Jr., Springfield, Pa., assignor to Piasecki Helicopter Corporation, Morton, Pa.

Application July 7, 1949, Serial No. 103,444

17 Claims. (Cl. 74—665)

This invention relates to the main drive unit for tandem rotor helicopters, and more particularly to the combined speed reducing and direction changing transmission and power clutch unit adapted for use between a single engine and the rear rotor drive shaft and the forward rotor transfer shaft of a twin tandem rotor helicopter.

It is a general object of the present invention to provide a novel and improved assembly of the type and for the purpose described.

More particularly it is an object of the invention to provide a unitary power converting assembly equipped with radial mounting pins arranged with a pair on a transverse axis and one on a fore and aft axis for support by fuselage elements at a position beneath the rear rotor and in alignment with its drive shaft axis, and having a downwardly inclined power shaft stub, an upwardly inclined transfer shaft stub, a vertically disposed rear rotor drive stub and intermediate clutch and gear mechanism for associating these various shafts in proper speed and direction ratios.

One of the important objects of the invention comprises the arrangement of a combined housing and foundation piece supporting the aforementioned mounting pins and providing for the attachment of upper and lower covers carrying all of the remaining parts and their bearing assemblies wherein a transmission assembly of extreme lightness and compactness is provided containing all of the various components for transmitting power from the engine to two rotors at appropriate speeds and synchronization and which takes and transfers the various thrusts, torques and couples resulting from the actions of the power unit and of the rotors and distributes them to the appropriate fuselage elements.

Another important object of the invention comprises the combination, in a single unit, of transmission elements, direction changing and speed reduction units between the engine and the rear rotor drive shaft and between the engine and the forward rotor transfer shaft whereby a minimum of mechanism for the purpose is required.

Still another important feature of the invention resides in the combination in a single unit of the power transmission and speed reduction mechanism and the dual clutch comprising a friction type clutch element for bringing the rotors up to speed and a positive or dog type of clutch for handling the power in flight, associated with novel mechanism for actuating the clutches in a predetermined sequence cycle.

One of the important objects in the clutch assembly arrangement is to eliminate unnecessary parts and to provide telescoped friction and dog clutch parts making use of a single dual purpose spring biasing the friction clutch to release and the dog clutch to engage.

A further important feature of the clutch arrangement comprises simplified mechanism having a rotatable means for actuating the operators for the two clutches in a sequence involving first the engagement of the friction clutch then engagement of the dog clutch, and finally disengagement of the friction clutch in a one-way motion and which on reverse motion releases the dog clutch without re-engaging the friction clutch.

Other and further objects and features of the invention including the arrangement of bearings, and the specific association and relationship of gears, other parts and the like, will be more apparent to those skilled in the art upon a consideration of the accompanying drawings and following specification wherein is disclosed a single exemplary embodiment of the invention as appears at present best adapted for use, with the understanding that such modifications and changes may be made therein as fall within the scope of the appended claims without departing from the spirit of the invention.

In said drawings:

Fig. 4 is a side elevation of the clutch operating cam and clutch cam followers shown in a setting with both clutches released and ready for rotation in the direction of the arrow to engage the friction clutch and then the dog clutch; and Fig. 5 is a view similar to Fig. 4 showing the clutch cam moving in the direction of the arrow and about to release the dog clutch.

The problems involved in driving the two rotors of a twin tandem rotor type of helicopter are manifold. The rotors have interleaving blades and hence must be driven in synchronism and be phased to prevent blade interference. This requires a positive connection between the shafts of the two rotors. The engine, and it is preferred to use a single one, must be of the high speed type to achieve the necessary reduction in size and weight and also to permit the use of conventionally available airplane type motors, while the rotors are operated at much reduced speeds to prevent supersonic travel of the tips of the blades. This necessitates speed reducing gearing. The transfer shaft between the two rotors is very long and must be mounted to avoid bending from the twisting action of the fuselage.

The transfer shaft must be positioned to offer the minimum interference with material and personnel and must pass over the top of the engine, which requires it to be well elevated. The unit of the present invention must therefore be placed high in the after section of the fuselage, and the engine, for purposes of stability and weight distribution, must be placed low. The shaft from the engine is therefore inclined upwardly toward the transmission. The forward rotor transmission, being higher than the rear rotor transmission, requires a transfer shaft upwardly inclined from the unit of the present invention. The rear rotor requires a high ratio gear reduction from the engine while the transfer shaft rotates at nearly engine speed.

In order to be able to bring the rotors slowly up to operating speeds and yet be able to start the engine at substantially no load a friction clutch must be introduced between the engine and the transmission and since friction clutches to handle the full engine power would be prohibitive in size and weight, a dog clutch is arranged to engage subsequent to the friction clutch. This is preferably of the overrunning type to permit auto-rotation of the rotors in the event the engine stops. It is desirable that the friction clutch be relieved and the dog clutch handle the full load after the rotors are brought up to speed. This relieves the drag of the friction clutch when the dog clutch is overrunning the engine on auto-rotation. The sequence of clutch operation can be automatic, and in accordance with the present invention the dog clutch is released without re-engagement of the friction clutch.

Figure 1:
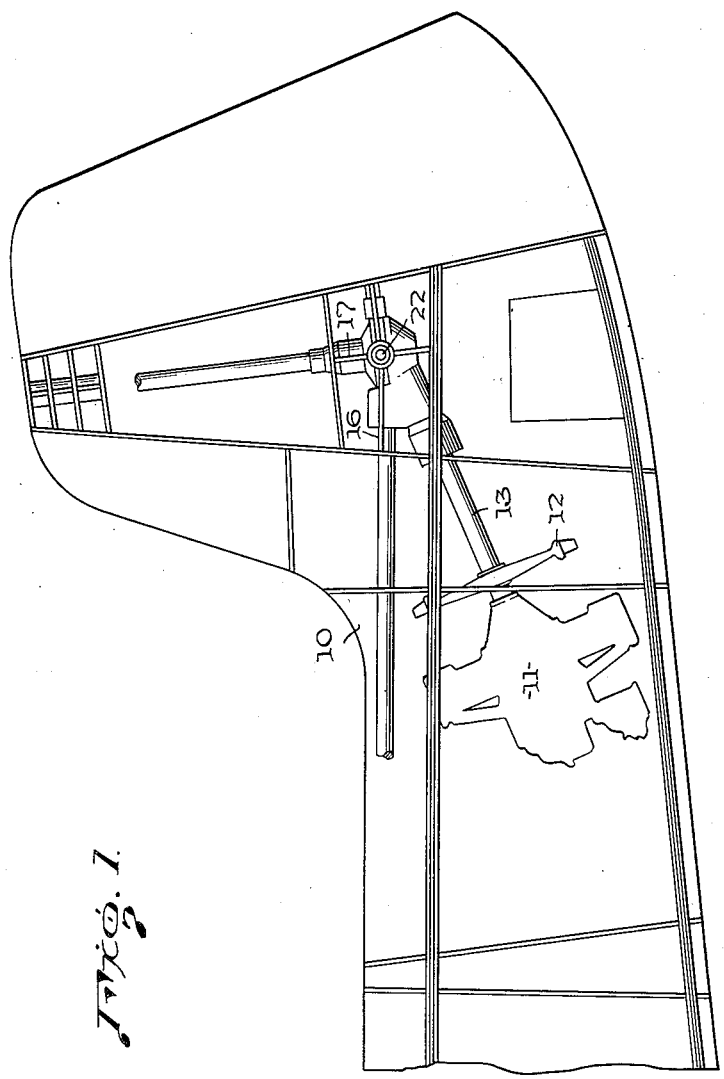
Fig. 1 is a vertical longitudinal central section through the after portion of the fuselage of a twin tandem rotor helicopter showing the apparatus of the present invention associated with the supporting elements of the fuselage.

Referring now to Fig. 1 of the drawing, there is shown at 10 the rear portion of the fuselage of a twin tandem rotor helicopter. Somewhere aft the center of the helicopter the radial type airplane engine 11 is suitably mounted, as shown, and equipped with a cooling fan 12 and drive shaft 13 leading to the unit 15 comprising the principal feature of the present invention. This unit is supported from appropriate structural elements 16 and 17 in the fuselage designed particularly to handle the complex torques, couples and thrusts imposed by the various sources of power, power transfer and energy absorption.

Figure 2:
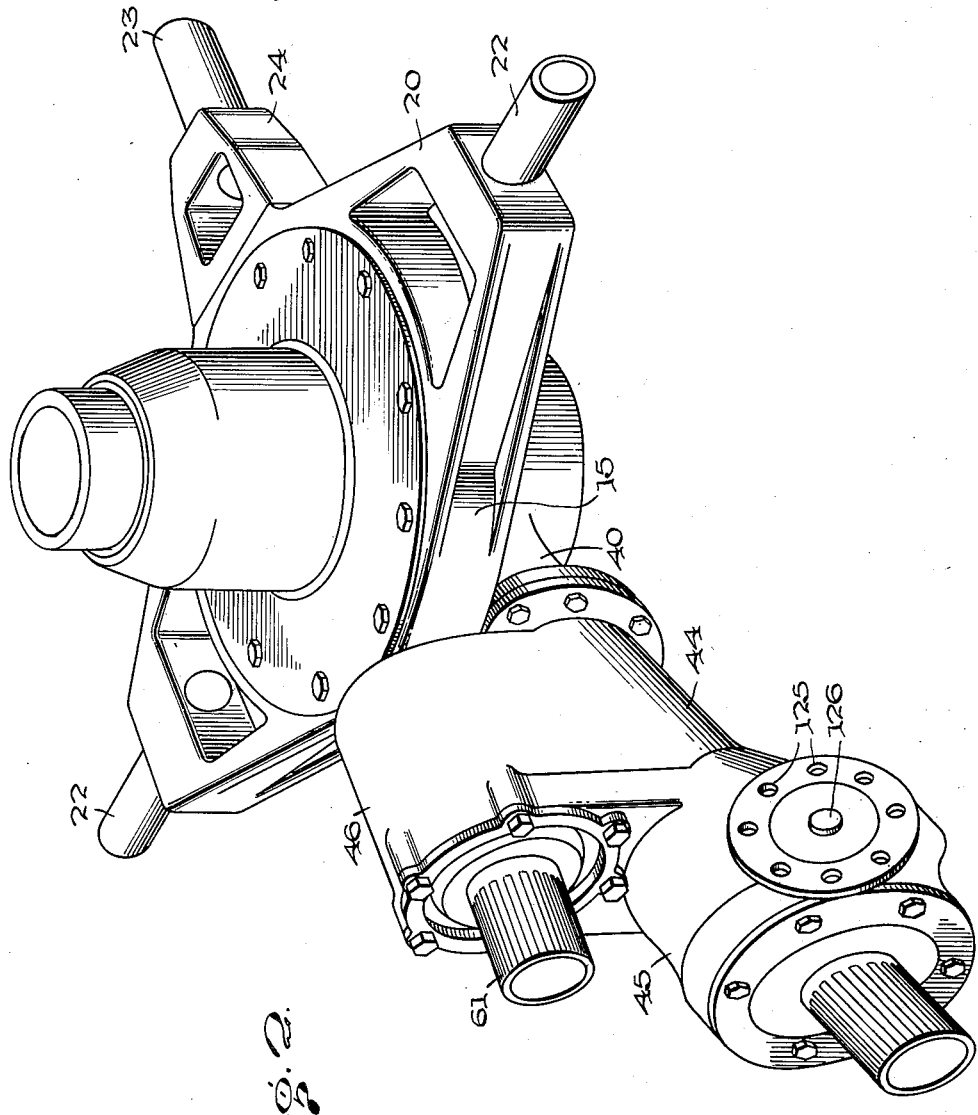
Fig. 2 is a perspective view of the assembled transmission and clutch unit showing the mounting pins extending from the foundation piece.

Referring now to Fig. 2, the complete assembly of the present invention is seen to be built up about a diamond-shaped foundation piece or housing 20, preferably a forging of light metal flanged and fitted with openings where permissible to reduce weight and increase strength. This unit has projecting from its two pointed ends the aligned supporting pins 22 appropriately mounted in rubber insulated bearings in the structural elements previously referred to. The axis of the pins 22 is transverse and they handle the counter torques for the main and transfer shafts as well as their other complex forces. To take care of turning moments about the axis of the pins 22 a third pin 23 extends directly rearwardly from an extension 24 of the foundation piece.

Figure 3:
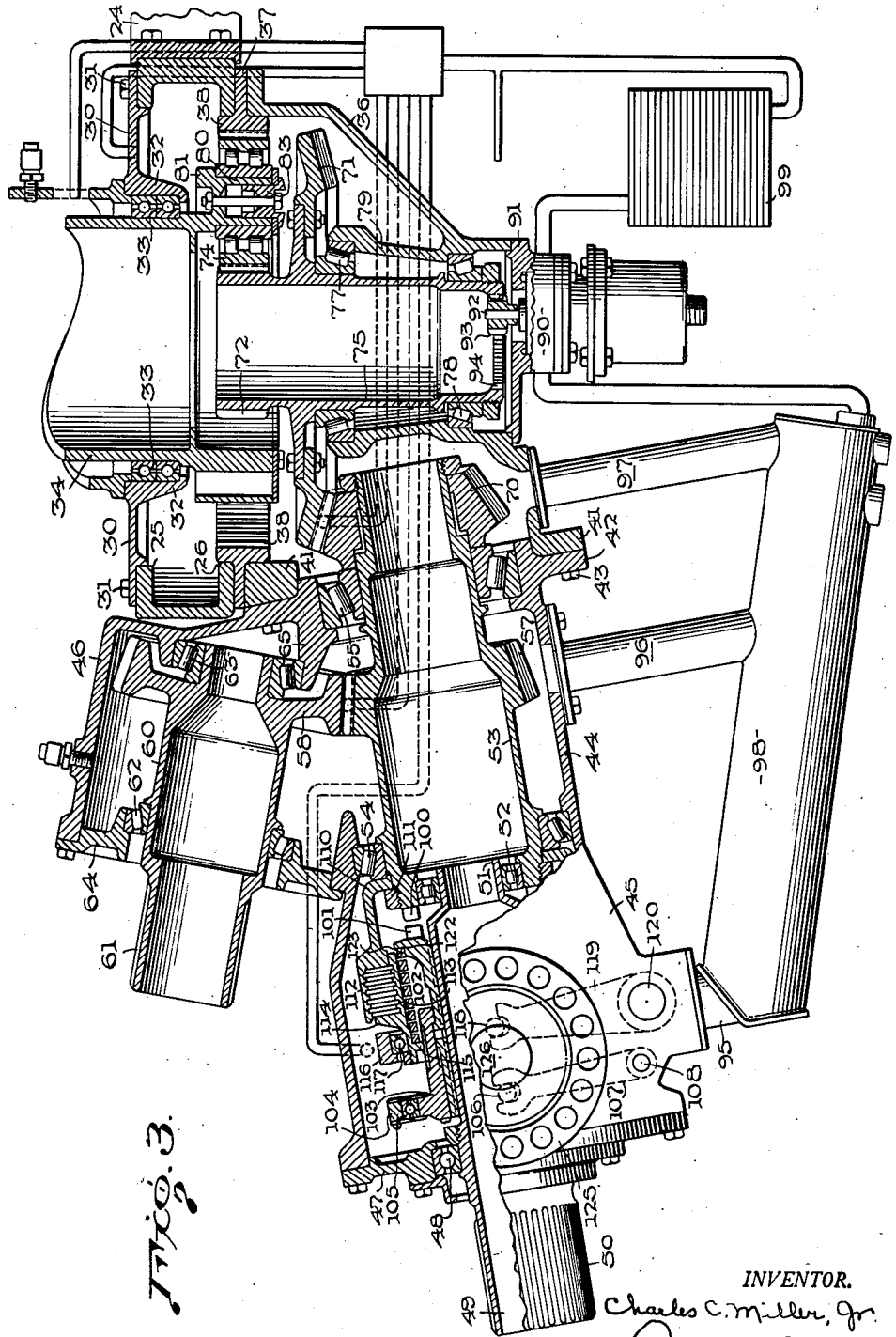
Fig. 3 is a longitudinal vertical central section through the unit of Fig. 2.

As seen in Fig. 3 the foundation piece is hollow and has flat, parallel, top and bottom surfaces containing the large central openings 25 and 26 surrounded by flange areas. The opening 25 is closed by a substantially flat top cover plate 30 appropriately flanged for centralization and attached by a plurality of studs 31 entering the flange of the piece 20. This cover has a central inturned boss 32 supporting the dual row ball bearing 33 for the lower end of rear rotor drive shaft stub 34.

The lower opening 26 in the foundation piece is closed by a deeply dished lower cover 36 of generally conical form having a flanged upper edge for bolting to the flange surrounding the lower opening in the foundation piece. Interposed between these flanges is the flat radial flange 37 of the internal orbit gear 38.

The lower cover 36 is formed with a neck 40 extending downwardly toward the left and flanged at its end at 41 in a plane converging downwardly toward the axis of the rotor shaft 34. Secured to this flange by a corresponding flange 42 and bolts 43 is an odd shaped housing 44 having the enlarged outer end 45 and the shorter upward extension 46.

At its outer end the enlargement 45 is closed by plate 47 which carries bearing 48 forming the principal support for the power shaft stub 49 splined on its outer end at 50 to receive the drive shaft from the engine. For the sake of lightness this power shaft is hollow, as shown, and its inner end at 51 is reduced in diameter to receive thereon the pilot bearing 52, the outer race of which is secured in the lower end of the main shaft assembly 53.

This assembly is likewise hollow and carries at its outer end the inner race of roller bearing 54 appropriately mounted in portions of the housing 44. A second roller bearing 55 adjacent the flange 42 forms a straddle support for the main drive shaft assembly. Intermediate the two bearings 54 and 55 is the preferably integral bevel gear 57 meshing with a corresponding gear 58 of greater diameter conveniently formed integral with the hollow transfer shaft stub 60 having an outwardly extending splined end 61 and spaced bearings 62 and 63 straddling the gear and mounted respectively in an end cover 64 and boss 65 of the upper portion 46 of the housing attachment 44. This transfer shaft stub drives the upwardly inclined transfer shaft leading to the forward rotor at a speed less than engine speed.

Speed reduction between the power shaft 49 and the rear rotor stub shaft 34 is achieved in two stages, the first between a bevel pinion 70 mounted on the inner end of main shaft unit 53 in the manner shown and meshing with teeth on the under surface of ring gear 71 arranged to rotate coaxially with and below the rotor stub 34, and secondly by an epicyclic gear train between the pinion 72, coincident with ring gear 71 and including planet gears 74 on the lower end of the rear rotor drive stub and the orbit gear 38.

The pinion 72 is preferably formed integral on the hollow ring gear shaft 75 mounted vertically below the drive stub of the rear rotor and having at least the intermediate portion of ring gear 71 integral therewith and arranged just below the pinion. Directly below this ring gear portion is the upper bearing 77 for the ring gear shaft and near the bottom of the shaft the lower bearing 78, these two having their outer races accommodated in a sleeve 79 directed upwardly from the narrow lower diameter of the lower cover 36 for the foundation piece.

The epicyclic gear train provides for reduction of the ring gear shaft speed by driving a plurality of planet gears 74 mounted on the stub shaft 34 about the inner surface of the orbit gear 38 under the action of the sun pinion 72, and for this purpose they mesh with both the orbit and sun gears. These planet gears 74 are mounted on hollow pins 80 conveniently formed integral with and depending from flange 81 arranged at the lower end of the rotor stub 34. Suitable plugs 83 are secured in the hollow lower ends of these bearing pins, by bolts shown, and have flanges overlapping the hubs of the planet gears to retain them in position.

In order to maintain the operation of this complex gear system under high speed and heavy loading adequate lubrication must be provided at all times, and a highly desirable manner of achieving this is to provide an oil pump 90 directly driven by the transmission for circulating lubricant in the housings. Such an oil pump may take the form of a conventional gear pump or any other desired form, carried by the closure plate 91 for the lower end of lower cover 36. The drive shaft 92 for this pump is positioned eccentric to the axis of ring gear shaft 75 and carries a pinion 93 meshing with internal teeth 94 formed integral with ring gear drive shaft 75 and giving the pump a relatively high rotational speed. Liquid from the pump is delivered by oil lines as shown to any desired number of points for insuring a continuous flow of oil to all bearings and gears even if the engine stops as the pump is then driven by the rotors. Oil is returned from the housing at several points by means of downcomer pipes 95, 96 and 97 leading to manifold 98 in which oil is collected for removal by the pump suction. The pump delivers through a cooler 99 and thence to the distributor and the various oil lines into the housing.

For achieving driving connection between the power shaft stub 49 and the main shaft 53, which are coaxial and adjacent, a pair of clutches is provided. The positive or dog clutch includes integral teeth 100 extending longitudinally from the lower end of main shaft 53 and adapted to mesh with corresponding teeth 101 projecting oppositely from collar 102 slidably splined on to power shaft 49. A rearwardly extending portion 103 of this collar carries a trunnioned yoke 104 by means of bearing 105, and this yoke has its trunnions 106 engaged by the forked ends of lever 107 secured to shaft 108 transversely supported in the enlargement 44 of the housing extension. The teeth 100 and 101 have substantially radial engaging faces on the driving sides but their backs are inclined to effect longitudinal movement of the collar 102 if the rotors overrun the engine.

A friction clutch also is adapted to connect the power shaft and main shaft, and it comprises a bell 110 secured to the inner end of the main shaft by splines and lock nut 111 and extending rearwardly to surround the collar 102. An enlarged cylindrical portion of the bell houses multiple plates 112 of a friction clutch. The cooperating plates 113 have their inner edges splined to a concentric sleeve 114 in the same manner as the outer edges of the alternate plates are splined to the bell 110. The two sets of plates can be compressed between radial faces of the bell and sleeve 114 to engage the clutch. The inner sleeve 114 is splined at 115 to the extension 103 of collar 102 and is hence driven at all times by the power shaft. Longitudinal movement of the sleeve 114 is achieved through its yoke 116 secured thereto by bearing 117 and carrying trunnions 118 engaged by forked lever 119 secured to shaft 120 mounted in the enlargement 45 parallel to shaft 108.

An appropriate forwardly facing shoulder 122 provides an abutment for helical spring 123 arranged just inside of sleeve 114 which carries the opposite abutment for the same as a portion of the splined part 115. This expansion helical spring will be seen to perform a dual purpose. It biases the collar 102 of the dog clutch toward engagement while biasing the operating collar 114 of the friction clutch toward disengagement. This means that levers 107 perform the principal duty of releasing the dog clutch while levers 119 must apply the energy to engage the friction clutch.

The clutches are arranged for operation in a predetermined sequence, as previously mentioned, under the action of a pulley 125 positioned on the side of and exterior to the extension 45 of the housing. This is mounted on and attached to shaft 126 passing through the housing and has mounted on its interior end a cam disc 127 better shown in Figs. 4 and 5. These figures show in dotted lines the pulley even though it may not be in proper position to show in such views. The pulley is conveniently operated by a cable 128 substantially completely surrounding it, whereby remote control of the clutches is available to the pilot. For cooperation with the cam disc a pair of cam follower levers 130 and 131 are provided, the former being secured to shaft 108 and the latter to shaft 120. The upper ends are fitted with rollers for engagement with the cam periphery.

The cam has a circular heel 132 of about 270° extent and a fixed lobe 133 having a substantially circular periphery and a gradually merging portion 134 for operation of the dog clutch lever 130. In the position shown in Fig. 4 the roller of operating lever 130 is raised on to the lobe 133 and serves to retract the collar extension 103 and hence the collar 102 carrying the dog teeth 101, thus disengaging the positive clutch against the bias of spring 123.

For cooperation with the roller of friction clutch follower lever 131 a movable cam lobe 135 is provided in the form of a plate pivoted at 136 to the cam disc and movable to extend beyond the heel periphery 132, as shown in Fig. 4, or to be withdrawn within this periphery, as shown in Fig. 5, by means of helical spring 137 appropriately attached to the disc and the plate. In addition to the main friction clutch operating lobe formed by movable plate 135 a second or plate-operating lobe 138 is provided thereon.

The cam plate 135 is adapted to be held in the extended position of Fig. 4 by having its free end rest on shoulder 139 of latch member 140 comprising a plate pivoted loosely to the shaft of the cam disc and biased in a counterclockwise direction by helical spring 141.

Considering now Fig. 4, the setting is such that the dog clutch is disengaged by virtue of the cam follower lever 130 being on cam lobe 133, while the friction clutch is disengaged under the action of helical spring 123 therefor, since the follower of its cam lever 131 is resting on cam heel 132 at the junction of the movable lobe 135 and the auxiliary lobe 138. If rotation is imparted to the pulley in the direction of the arrow in Fig. 4, the movable lobe 135 turns the lever 131 in a clockwise direction, thus forcing the discs of the friction clutch together and permitting the motor to assume the load of driving the rotors. As the follower of lever 131 starts to move down the sloping portion 142 of the movable lobe there will be some slight slipping of the friction clutch taking place while the follower lever 130 moves down the merging surface 134 to engage the dog clutch. Thus engagement is insured by virtue of the slight relative movement of the teeth caused by the friction clutch slipping, thus preventing the end abutment of the teeth.

When the follower of lever 130 reached the heel 132 the follower roller or lever 131 also reaches the heel at the end of movable lobe 135 and the continued cam rotation forces the trigger 144 on the end of latch plate 140 against the roller on the end of lever 131 and withdraws the holding surface 139 from beneath the inner end of the movable lobe 135 which is immediately withdrawn to the position shown in Fig. 5 by the action of its spring 137 and comes to rest on shelf 145 on the latch plate, as clearly seen in Fig. 5. The engine is now permitted to operate and drive the rotors solely through the action of the positive clutch. When it is desired to disengage the clutch, reverse rotation of the pulley, as shown by the arrow in Fig. 5, has no effect on the now released friction clutch because operating lobe 135 is retracted and the release operation is not the reverse of the engaging operation but merely withdraws the dog clutch as the follower of lever 130 rides up the slope 134 toward the surface of the lobe 133.

At the termination of the release cycle of rotation of cam 127 in the direction of rotation as indicated by the arrow in Fig. 5, the auxiliary lobe 138 on cam lobe plate 135 moves against the relatively rigid roller on the end of lever 131 and serves to rotate this plate in a counterclockwise direction against the action of spring 137 until the tip of plate 135 moves up from the position illustrated in Fig. 5 onto holding surface 139 of latching plate 140 to reposition the elements for the engaging cycle. The parts are now in the position illustrated in Fig. 4.

By this unique arrangement of clutch elements a small, light weight friction clutch of insufficient power to handle the full output of the engine is used to bring the rotors up to speed and hold them until the dog clutch is engaged, whereupon pressure is taken off the friction clutch not merely to relieve it from any strain during the driving operation but to permit rotors to overrun the engine by virtue of the inclined backs of the dog teeth, without drag of the friction clutch. The spring 123 is readily compressed to permit this overrunning. The friction clutch is not then re-engaged on the release of the dog clutch so that it is subjected to but very minor wear in the whole cycle of operation.

I claim:

1. For use with a tandem-rotor helicopter, a drive unit comprising in combination, a housing for mounting in direct alignment with the rear rotor drive shaft, a rear rotor stub shaft journalled vertically in said housing, a bevel ring gear journalled below and coaxial with said stub shaft, an epicyclic reduction gear train between said gear and shaft, a main drive shaft journalled in said housing on an axis intersecting that of the stub shaft at an obtuse angle, a pinion on said main drive shaft meshing with said ring gear, a combination friction and positive clutch unit interposed in said main drive shaft within said housing, a forward rotor drive shaft journalled in said housing on an axis acute to both those of the main shaft and rear rotor stub shaft, and meshing bevel gears connecting the main shaft and forward rotor drive shaft on the pinion side of said clutch unit.

2. The unit as defined in claim 1 in which the clutch unit includes both a friction and a positive drive clutch and independent actuators for each clutch.

3. The unit as defined in claim 2 in which cam means is provided to successively operate said actuators to engage the friction and positive clutches, and having a lobe and a dwell operative on further movement to disengage the friction clutch only and on reverse movement to disengage the positive clutch without re-engaging the friction clutch.

4. A clutch unit for the main drive shaft of a tandem rotor helicopter comprising in combination, a pair of shaft sections, a friction clutch adapted to connect said sections, a positive jaw clutch adapted to connect said sections, a first actuator for said friction clutch, a second actuator for the positive clutch, a control unit adapted for manual operation and including a cam arranged for limited forward and reverse rotation and adapted for movement of said actuators, said cam having lobes shaped and positioned to successively cause engagement of the friction clutch, engagement of the positive clutch and then disengagement of the friction clutch upon forward movement and means cooperating with said cam and actuators on reverse rotation of the cam to cause the friction clutch to remain in disengagement and the positive clutch to be disengaged.

5. The clutch unit as defined in claim 4 in which the actuators include cam followers, a single spring cooperating with the movable portions of the two clutches and arranged to urge the first toward opening and the second toward closing.

6. The clutch unit as defined in claim 5 in which the positive jaw clutch is fitted with cooperating teeth engageable on relative axial movement, said teeth each having a face substantially parallel to said movement axis and a face inclined to the axis whereby overrunning is effected by sliding of the inclined teeth and consequent compression of the spring.

7. The clutch unit as defined in claim 5 in which said cam is of the disc type having a substantially circular periphery broken by a single fixed lobe having a circular plateau, and a movable lobe element pivoted to said disc and having a short lobe always projecting beyond said periphery and a long follower operating lobe normally below the said periphery.

8. The clutch unit as defined in claim 7 in which said short lobe cooperates with a follower to extend the long lobe beyond said periphery and latch means to hold said movable lobe element in the extended position.

9. The clutch unit as defined in claim 8 in which said latch is spring closed and is provided with an extension adapted to engage said same follower to release the movable lobe element and a spring to retract said lobe element.

10. A clutch and drive unit for a helicopter rotor comprising a housing, a main shaft unit journalled in said houseing, gears on said unit, clutch teeth on one end of said unit, a friction clutch bell surrounding and extending beyond said teeth, clutch plates housed in said bell, a main drive shaft stub journalled in said housing coaxial with said unit, a collar slidably splined to said stub and having teeth engageable with those first mentioned, a second collar slidably splined to said stub and having clutch plate supporting and compressing surfaces, a spring compressed between said collars tending to engage the teeth and release compression on said plates, each collar having a trunnioned yoke journalled thereon and separate operating levers journalled in said housing for said yokes.

11. A clutch and drive unit for a helicopter rotor comprising in combination a housing, a main shaft unit journalled in said housing by spaced bearings, a pair of gears on said unit straddling one of said bearings, dog and plate clutch elements on said unit outboard of the other bearing, a main drive shaft stub journalled in said housing coaxial and coextensive with said unit, complementary clutch elements slidably splined on said stub, single means biasing the dog clutch engaged and the plate clutch disengaged and means to independently actuate said second mentioned clutch elements against their biases.

12. The unit defined in claim 11 in which each last mentioned means is provided with a cam follower, a cam journalled in said housing between said followers, a shaft secured to said cam and extending through the housing wall and an operating pulley on said shaft.

13. A transmission unit for twin tandem rotor helicopters comprising in combination a foundation piece having a large circular opening with vertical axis, flat top and bottom walls, and side and rear extensions, a mounting pin secured to and extending radially from each projection, a rear propeller drive tube having vertical axis, a cover plate secured to the top of said piece and centrally supporting a bearing for said tube, a deeply dished lower cover for said piece, a hollow shaft unit coaxial with and partially telescoped into the lower end of said tube, a pinion at the upper end of said unit, a ring gear below said pinion, spaced bearings in said lower cover engaging said unit below said gear, an orbit gear having a flange secured between the foundation piece and the lower cover, planet gears journalled in the lower end of said drive tube and meshing with the orbit gear and said pinion, a main drive shaft having spaced bearings supported by said lower cover, a bevel pinion on said main shaft outboard of said spaced bearings meshing with said ring gear, an internal gear at the lower end of said hollow shaft unit and an accessory drive pinion meshing with said internal gear.

14. A transmission unit for twin tandem rotor helicopters comprising in combination a foundation piece having a large circular opening with a vertical axis, flat top and bottom walls, side and rear extensions with radial mounting pins therein, a rear propeller drive tube having a vertical axis, a flat cover plate secured to the top of said piece and centrally supporting a bearing for said tube, a deeply dished lower cover for said piece, a hollow shaft unit coaxial with and partially telescoped into the lower end of said tube, a pinion at the upper end of said unit, a ring gear below said pinion, spaced bearings in said lower cover engaging said unit below said gear, an orbit gear having a flange secured between the foundation piece and the lower cover, planet gears journalled in the lower end of said drive tube and meshing with the orbit gear and said pinion, an auxiliary housing secured to and extending laterally from the lower cover, a tubular main shaft having an end pinion meshing with said ring gear, a pair of spaced bearings for said main shaft positioned in said auxiliary housing to incline the shaft axis downwardly from the horizontal, a hollow transfer shaft stub above said main shaft, bearings in said auxiliary housing inclining said transfer stub axis upwardly from the horizontal and meshing bevel gears on said main shaft and transfer stub each positioned intermediate its shaft bearings.

15. In a transmission unit in combination, a hollow body and foundation piece open top and bottom and having transverse extensions and a rear extension, radially disposed mounting pins projecting from said extensions, a vertical hollow propeller shaft drive stub extending into said piece and having its axis intersection that of said pins, a cover for said piece, a bearing for said stub in said cover, an orbit gear, a deeply dished lower cover for said piece, common fastening means securing the gear and lower cover to said piece, a plurality of journals spaced about the lower end of said stub, a planet gear on each journal meshing with the orbit gears, a sun pinion meshing with the orbit gears, a shaft mounting from top to bottom thereof said sun pinion, a bevel ring gear and spaced bearings, a sleeve in said lower cover supporting said spaced bearings, said lower cover having a lateral extension opposite to said rear extension on said piece, converging main and transfer shaft stubs, spaced bearings in said cover extension for each of said converging shafts, bevel gears on said converging shafts between the bearings thereon to drive one from the other, and a pinion on the inner end of the main shaft meshing with said ring gear.

16. The unit as defined in claim 15 in which the lower cover lateral extension is longer than the main shaft, a power shaft entering the end of said extension coaxial with said main shaft, a bearing at said end, a pilot bearing between the main and power shafts and clutch members on said last mentioned shafts for cooperation to drive one from the other.

17. The unit as defined in claim 15 in which the shaft mounting the sun pinion is hollow, teeth projecting inwardly at the bottom of said shaft, an oil pump mounted beneath the lower cover and having a shaft projecting therethrough, and a pinion on said pump shaft meshing with said teeth.

CHARLES C. MILLER, Jr.

REFERENCES CITED

The following references are of record in the file of this patent:

UNITED STATES PATENTS

| Number | Name | Date |
| --- | --- | --- |
| 1,024,595 | Noyes | Apr. 30, 1912 |
| 1,546,967 | Buehler | July 21, 1925 |
| 1,994,488 | Sikorsky | Mar. 19, 1935 |
| 2,091,449 | Littel et al. | Aug. 31, 1937 |
| 2,471,904 | Seibel | May 31, 1949 |
| 2,487,952 | Sznycer | Nov. 15, 1949 |
| 2,495,988 | Sheppard | Jan. 31, 1950 |
| 2,520,887 | Miller, Jr. | Aug. 29, 1950 |

FOREIGN PATENTS

| Number | Country | Date |
| --- | --- | --- |
| 594,464 | Great Britain | Nov. 12, 1947 |
| 596,371 | Great Britain | Jan. 2, 1948 |